Patented Nov. 4, 1952

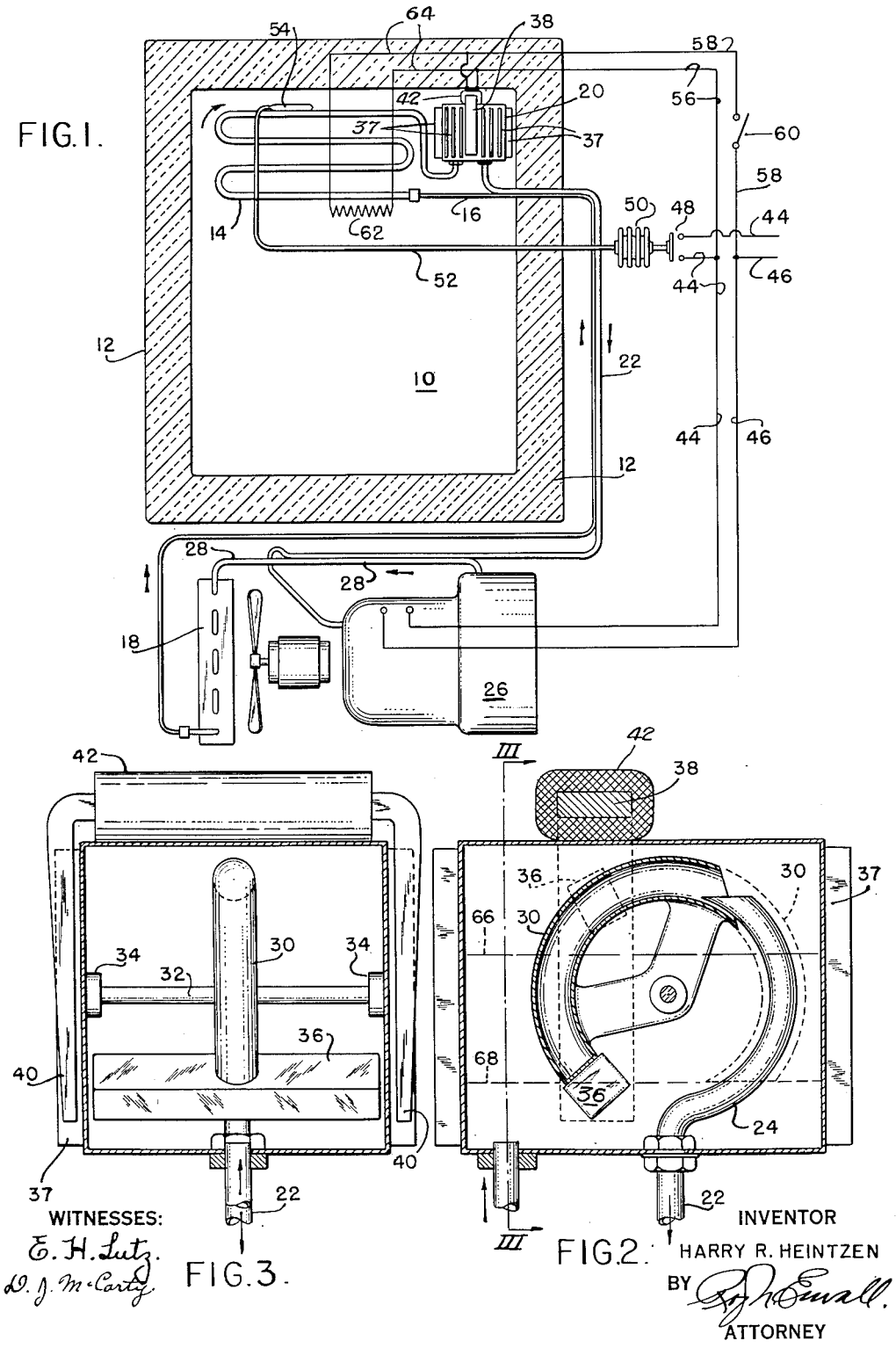

2,616,268

UNITED STATES PATENT OFFICE 2,616,268

DEFROSTING ARRANGEMENT IN REFRIGERATING APPARATUS

Harry R. Heintzen, Philadelphia, Pa., assignor to Westinghouse Electric Corporation, East Pittsburgh, Pa., a corporation of Pennsylvania Application April 17, 1950, Serial No. 156,322

5 Claims. (Cl. 62—4)

This invention relates to refrigeration apparatus and more especially to a means for rapidly defrosting the evaporator of such apparatus.

It is an object of this invention to provide a novel refrigerant trap for storing refrigerant liquid during the refrigerating operation of the apparatus, the trap also forming the header for a refrigerant evaporator.

It is a further object of the invention to provide novel means for releasing the refrigerant liquid from the trap during the defrosting operation of the apparatus.

These and other objects are effected by my invention as will be apparent from the following description and claims taken in connection with the accompanying drawings, forming a part of this application, in which:

Fig. 1 is a schematic drawing of a refrigerator and the refrigerant trap of this invention;

Fig. 2 is a vertical sectional view of the liquid trap of this invention; and

Fig. 3 is a sectional view on the line III—III of Fig. 2.

Referring to the drawings, the reference numeral 10 designates a food storage chamber formed by thermally insulated walls 12. An evaporator 14 is located in the upper portion of the food storage chamber and is supplied with a volatile refrigerant liquid through a capillary tube 16 from an air-cooled condenser 18. The evaporator 14 connects with a vessel 20 which forms a header in which the refrigerant liquid and the refrigerant vapor separate prior to the passage of the refrigerant vapor to the compressor during the refrigeration of the evaporator.

The vessel 20 also forms a trap for storing the excess refrigerant liquid of the apparatus. A suction conduit 22 communicates with the upper portion of the vessel through an arcuate tube 24 which lies within the vessel 20. The suction conduit 22 communicates with a sealed casing 26 which contains a refrigerant compressor and a motor for driving the compressor. The compressor and motor are not shown in the drawings. A portion of the capillary tube 16 and the suction conduit 22 are connected together in heat-transfer relationship. The refrigerant compressor compresses the vapor and forces it through a pressure conduit 28 into the condenser 18 wherein the vapor is condensed. The pressure conduit 28 is also connected in heat-transfer relationship with a portion of the suction conduit 28.

A blind arcuate tube 30 is secured to a shaft 32 which is journaled in the bearings 34 in the sides of the vessel 20. The blind tube 30 is adapted to rotate with the shaft 32 and slide over the arcuate tube 24. The blind tube 30 carries an iron bar 36 at its lower end which extends to nearly the side walls of the vessel 20. The walls of the vessel 20, the shaft 32 and the blind tube 30 are formed of non-magnetic metals. Heat absorbing fins 37 are preferably secured to the side walls of the vessel 20.

A horseshoe type electromagnet 38 comprising the pole pieces 40 and the electric solenoid 42 saddles the vessel 20 so that the lower end of the pole pieces 40 are opposite to the ends of the iron bar 36 when the bar 36 is in its lower position. When the solenoid 42 is energized, the pole pieces 40 lift the iron bar 36 to its upper position as shown in the dotted lines in Fig. 2. When in this position, the blind tube 30 is telescoped over the arcuate tube 24.

The electric motor in the sealed casing 26 receives its power through leads 44 and 46 and a thermostatic switch 48 is located in the lead 44. The thermostatic switch 48 is actuated by a bellows 50 which communicates through a tube 52 with a bulb 54 located on the evaporator 14. The bulb 54 contains a small quantity of a volatile liquid, the vapor pressure of which is responsive to the temperature of the evaporator 14 and actuates the bellows 50 to close the thermostatic switch 48 whenever the temperature of the evaporator 14 drops below a certain limit. The thermostatic switch 48 thus controls the compressor to maintain the evaporator 14 at a substantially constant temperature.

The electromagnet 38 receives its power from leads 44, 46 through leads 56, 58 and the manually operated switch 60. An electric heater 62 may be located adjacent the entrance of the evaporator 14 and connected in parallel with the electromagnet 38 through leads 64.

Operation

During the normal refrigerating operation of the apparatus, the switch 60 is open and the blind tube 30 is in the position shown in the full lines in Fig. 2. The refrigerant vapor issuing from the evaporator 14 carries entrained droplets of refrigerant liquid and lubricating oil. These liquids separate from the refrigerant vapor while in the vessel 20 and the liquids fill the vessel to the level indicated by line 66. The vapor is drawn off through the arcuate tube 24. The evaporator 14 as well as the vessel 20 is cooled by the evaporation of refrigerant liquid as is well understood in the art.

When the evaporator 14 requires defrosting, the manually operated switch 60 may be closed. When this switch 60 is closed and the thermostatic switch 48 also closes, the electromagnet 38 is energized and rotates the blind tube 30 clockwise to cover the arcuate tube 24. The heater 62 if used is also energized. The compressor now withdraws refrigerant liquid and oil from the vessel 20 through the space between the two arcuate tubes 24 and 30 until the liquid drops to the level indicated by the line 68.

The refrigerant liquid thus withdrawn through the suction conduit 22 is partially vaporized by the portion of the capillary tube 16 which is in heat-transfer relationship therewith. Refrigerant liquid in the suction conduit 22 is further vaporized by the hot pressure conduit 28 in the portion of the suction conduit 22 in heat-exchange relationship therewith. Any remaining refrigerant liquid enters the sealed casing 26 and is vaporized therein by the heat of the electric motor and the compressor. The lubricating oil returns to the oil sump in the sealed casing 26.

The vaporization of the refrigerant liquid in the suction conduit 22 and in the sealed casing 26 raises the suction pressure in the evaporator 14 and the vessel 20 so that the liquid therein does not vaporize. The cool refrigerant liquid therein is replaced by warm refrigerant liquid entering the evaporator 14 through the capillary tube 16. This warm liquid causes the frost on the evaporator 14 and on the vessel 20 to melt. The melting of the frost is accelerated by the heater 62 (if used) located at the entrance of the evaporator 14 and connected in parallel with the electromagnet 38.

When the frost on the evaporator 14 and the vessel 20 has melted the switch 60 may be opened. This deenergizes the heater 62 and allows the bar 36 to drop so that the blind tube 30 uncovers the upper end of the arcuate tube 24. Normal refrigeration of the evaporator 14 and of the vessel 20 now takes place and the vessel 20 will again trap refrigerant liquid until this liquid rises to the level of the line 66.

It will be apparent from the above that this invention provides a refrigerant header for an evaporator which header also forms a novel refrigerant trap for storing excess refrigerant liquid during the refrigerating operation of the apparatus and novel means for releasing this refrigerant liquid when defrosting of the evaporator is desired. The releasing of the refrigerant liquid also releases the oil accumulating in the refrigerant header 20.

While I have shown my invention in but one form, it will be obvious to those skilled in the art that it is not so limited, but is susceptible of various changes and modifications with out departing from the spirit thereof.

What I claim is:

1. A refrigerating circuit for selectively refrigerating or heating an evaporator, said circuit comprising an evaporator, a compressor, a suction conduit connecting the outlet of said evaporator with the inlet of said compressor, storage means located in said circuit between at least a portion of said evaporator and said compressor and arranged to trap refrigerant liquid flowing from said evaporator, means for releasing said trapped refrigerant liquid, means for vaporizing the refrigerant liquid released from said storage means before said liquid reaches said compressor, a condenser for receiving compressed refrigerant vapor from said compressor, and a liquid line including a pressure-reducing device for conducting refrigerant liquid from said condenser to said evaporator.

2. In refrigerating apparatus, the combination of a refrigerant compressor, a condenser for receiving compressed refrigerant vapor from said compressor, an evaporator for receiving refrigerant liquid from said condenser, a vessel for receiving refrigerant liquid and vapor from said evaporator, a suction conduit for conducting refrigerant from said vessel to said compressor, said suction conduit having an entrance communicating with said vessel and adapted to communicate selectively either with an upper portion or with a lower portion thereof, and heating means associated with said conduit for vaporizing refrigerant liquid which may be flowing therethrough.

3. The refrigerating apparatus defined in claim 2 including a quantity of refrigerant liquid in said apparatus such that when said apparatus is operating normally and the entrance of said suction conduit communicates with the upper portion of said vessel, refrigerant liquid will accumulate in the lower portion thereof.

4. In refrigerating apparatus, the combination of a compressor, a condenser, an evaporator and a vessel, said compressor, condenser, evaporator, and vessel being connected in an operative circuit, said circuit including a tube connected to said vessel for withdrawing refrigerant liquid therefrom, said tube extending upwardly in said vessel to an upper part thereof, said tube being bent in the shape of an arc, and a blind tube in said vessel, the inner cross-sectional area of the blind tube being larger than the outer cross-sectional area of said discharge tube, said blind tube being bent in the shape of an arc of substantially the same radius as the arc of said discharge tube, said blind tube being pivoted on an axis to telescope over said discharge tube to form a refrigerant passage between said two arced tubes which passage communicates with a lower part of said vessel.

5. A closed refrigerating circuit for selectively refrigerating or heating an evaporator, said circuit comprising a high pressure side including a condenser, a liquid line and an expansion device, a low pressure side including an evaporator and a suction conduit, a compressor for conveying refrigerant from said low pressure side to said high pressure side, storage means located in the low pressure side of said circuit between at least a portion of said evaporator and said compressor and arranged to trap refrigerant liquid, means for releasing said trapped refrigerant liquid, and means for vaporizing refrigerant liquid released by said storage means before said liquid reaches said compressor.

HARRY R. HEINTZEN.

REFERENCES CITED

The following references are of record in the file of this patent:

UNITED STATES PATENTS

| Number | Name | Date |
| --- | --- | --- |
| 2,459,173 | McCloy | Jan. 18, 1949 |